United States Patent
Hwang et al.

(10) Patent No.: US 12,417,511 B2
(45) Date of Patent: Sep. 16, 2025

(54) APPARATUS FOR INTERPOLATING POINT CLOUD AND METHOD THEREOF

(71) Applicant: UNIVERSITY-INDUSTRY COOPERATION GROUP OF KYUNG HEE UNIVERSITY, Yongin-si (KR)

(72) Inventors: Yong Hae Hwang, Suwon-si (KR); Jun Sik Kim, Ansan-si (KR); Kyu Heon Kim, Seoul (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 391 days.

(21) Appl. No.: 18/074,072

(22) Filed: Dec. 2, 2022

(65) Prior Publication Data

US 2023/0206391 A1 Jun. 29, 2023

(30) Foreign Application Priority Data

Dec. 23, 2021 (KR) .......... 10-2021-0186478

(51) Int. Cl.
*G06T 3/4007* (2024.01)
*G06T 9/00* (2006.01)

(52) U.S. Cl.
CPC ............ *G06T 3/4007* (2013.01); *G06T 9/001* (2013.01)

(58) Field of Classification Search
CPC ......... G06T 3/4007; G06T 9/001; G06T 9/00; G06T 2207/10028; H04N 19/563; H04N 19/56; H04N 19/597
See application file for complete search history.

(56) References Cited

U.S. PATENT DOCUMENTS

2023/0074762 A1 * 3/2023 Huang .................... G06T 9/001

FOREIGN PATENT DOCUMENTS

| KR | 10-2021-0022115 A | 3/2021 | |
|----|-------------------|--------|----|
| KR | 10-2021-0029804 A | 3/2021 | |
| WO | WO-2023174701 A1 * | 9/2023 | ............ G06T 9/001 |
| WO | WO-2024174101 A1 * | 8/2024 | |

OTHER PUBLICATIONS

Graziosi D, Nakagami O, Kuma S, Zaghetto A, Suzuki T, Tabatabai A. An overview of ongoing point cloud compression standardization activities: video-based (V-PCC) and geometry-based (G-PCC). APSIPA Transactions on Signal and Information Processing. 2020;9:e13. doi:10.1017/ATSIP.2020.12 (Year: 2020).*

Graziosi, Danillo, et al. "An overview of ongoing point cloud compression standardization activities: Video-based (V-PCC) and geometry-based (G-PCC)." APSIPA Transactions on Signal and Information Processing 9 (2020): e13. (Year: 2020).*

Yonghaw Hwang, et al. "2D Interpolation of 3D Points using Video-based Point Cloud Compression" JBE vol. 26, Nov. 2021, ISSN 1226-7953 (12 pages).

* cited by examiner

*Primary Examiner* — Charles T Shedrick

(74) *Attorney, Agent, or Firm* — Sughrue Mion, PLLC

(57) ABSTRACT

Disclosed are an apparatus for interpolating a point cloud and a method thereof. More particularly, a technology for interpolating a point cloud based on V-PCC decoding information and a 2D interpolation technology is disclosed.

12 Claims, 16 Drawing Sheets

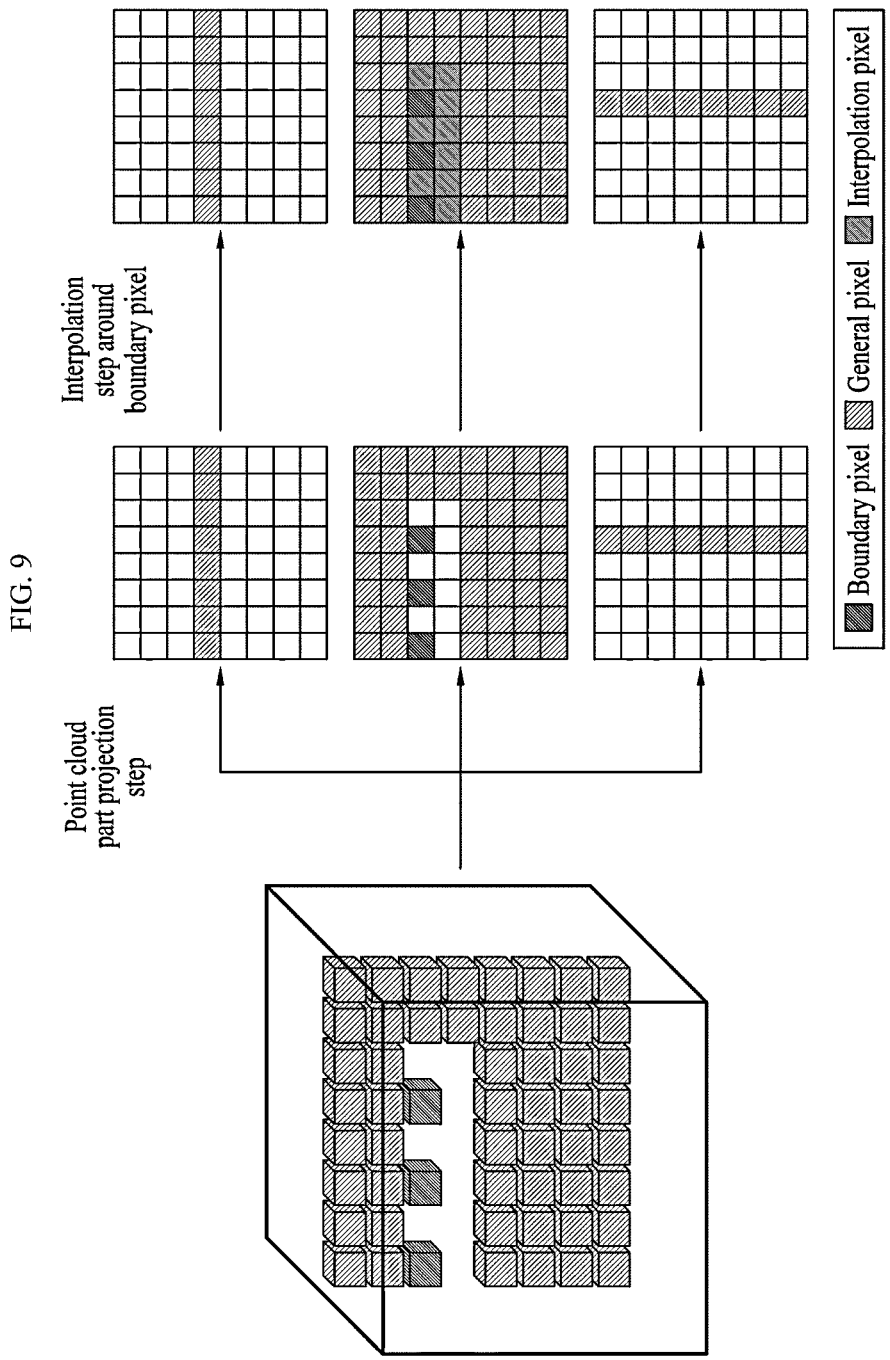

APPARATUS FOR INTERPOLATING POINT CLOUD AND METHOD THEREOF

CROSS-REFERENCE TO RELATED APPLICATION

This application claims priority to Korean Patent Application No. 10-2021-0186478, filed on Dec. 23, 2021 in the Korean Intellectual Property Office, the disclosure of which is incorporated herein by reference.

BACKGROUND OF THE DISCLOSURE

Field of the Disclosure

The present disclosure relates to an apparatus for interpolating a point cloud and a method thereof, and more particularly a technology for interpolating a point cloud based on V-PCC decoding information and a 2D interpolation technology.

Description of the Related Art

In a method of interpolating by increasing the density of a point cloud, increasing the density of a point cloud using 3D operation requires a lot of computation time due to a complicated computation process, and there is a limit in determining the exact location of the point. In addition, when the 2D interpolation method is applied as it is, there is a problem of generating incorrect points in the case of points that are spaced apart from each other in a 3D space but are located close to each other in a 2D space.

RELATED ART DOCUMENT

Patent Document (Patent Document 1) Korean Patent Application Publication No. 10-2021-0029804, "A METHOD AND DEVICE FOR ENCODING/DECODING THE GEOMETRY OF A POINT CLOUD"

SUMMARY OF THE DISCLOSURE

Therefore, the present disclosure has been made in view of the above problems, and it is an object of the present disclosure to provide a technology for applying a 2D interpolation technology based on 3D spatial information.

It is another object of the present disclosure to provide a technology for interpolating a point cloud using V-PCC decoding information.

It is yet another object of the present disclosure to provide an efficient point cloud interpolation technology.

In accordance with an aspect of the present disclosure, the above and other objects can be accomplished by the provision of an apparatus for interpolating a point cloud, including: a V-PCC decoder configured to generate a point cloud by decoding patch auxiliary information, an occupancy map, a geometry image, and an attribute image from a V3C bitstream; a patch searcher configured to search for an internal patch, which is included inside another patch, and an external patch, which includes the internal patch thereinside, among a plurality of patches based on the patch auxiliary information; a boundary point searcher configured to search for an additional boundary point of the external patch by projecting a boundary point of the internal patch into a 2D patch space of the external patch; a 2D interpolation point generator configured to create a boundary map based on boundary points of the plural patches and the additional boundary point and to generate a 2D interpolation point that is a new point for an occupied area by applying a 2D interpolation technology to the geometry image and the attribute image based on the boundary map; and a boundary interpolation point generator configured to divide an entire space formed by the point cloud and the 2D interpolation point into regions of a preset size, to create an interpolation geometry image, an interpolation attribute image, and an interpolation boundary map by projecting each divided region based on XY, XZ and YZ planes, to create interpolation pixel information by applying a 2D interpolation technology using neighboring pixel information in an unoccupied region among neighboring regions of boundary points based on the interpolation boundary map, and to create a boundary interpolation point, which is a new point for the unoccupied region, based on 3D spatial information about the interpolation pixel and region.

In an embodiment, the patch searcher may compare 3D spatial position coordinates of a plurality of patches based on 3D spatial information of each patch included in the patch auxiliary information to search for the internal patch and the external patch.

In an embodiment, the boundary point searcher may extract location information of an overlapping region on a 2D patch space of the external patch by projecting points of the internal patch into the 2D patch space, and may determine a point corresponding to the location information among points of the external patch as an additional boundary point of the external patch when a point corresponding to the location information among points of the external patch and a point corresponding to the location information among points of the internal patch are within a preset distance in 3D space.

In accordance with another aspect of the present disclosure, there is provided a method of interpolating a point cloud, the method including: generating a point cloud by decoding patch auxiliary information, an occupancy map, a geometry image, and an attribute image from a V3C bitstream; searching for an internal patch, which is included inside another patch, and an external patch, which includes the internal patch thereinside, among a plurality of patches based on the patch auxiliary information; searching for an additional boundary point of the external patch by projecting a boundary point of the internal patch into a 2D patch space of the external patch; creating a boundary map based on boundary points of the plural patches and the additional boundary point and creating a 2D interpolation point that is a new point for an occupied area by applying a 2D interpolation technology to the geometry image and the attribute image based on the boundary map; dividing an entire space formed by the point cloud and the 2D interpolation point into regions of a preset size and creating an interpolation geometry image, an interpolation attribute image, and an interpolation boundary map by projecting each divided region based on XY, XZ and YZ plane; and creating interpolation pixel information by applying a 2D interpolation technology using neighboring pixel information in an unoccupied region among neighboring regions of boundary points based on the interpolation boundary map and creating a boundary interpolation point, which is a new point for the unoccupied region, based on 3D spatial information about the interpolation pixel and region.

BRIEF DESCRIPTION OF THE DRAWINGS

The above and other objects, features and other advantages of the present disclosure will be more clearly understood from the following detailed description taken in conjunction with the accompanying drawings, in which:

FIGS. 8A, 8B and 9 are views for explaining point cloud projection according to an embodiment of the present disclosure;

DETAILED DESCRIPTION OF THE DISCLOSURE

Figure 1:
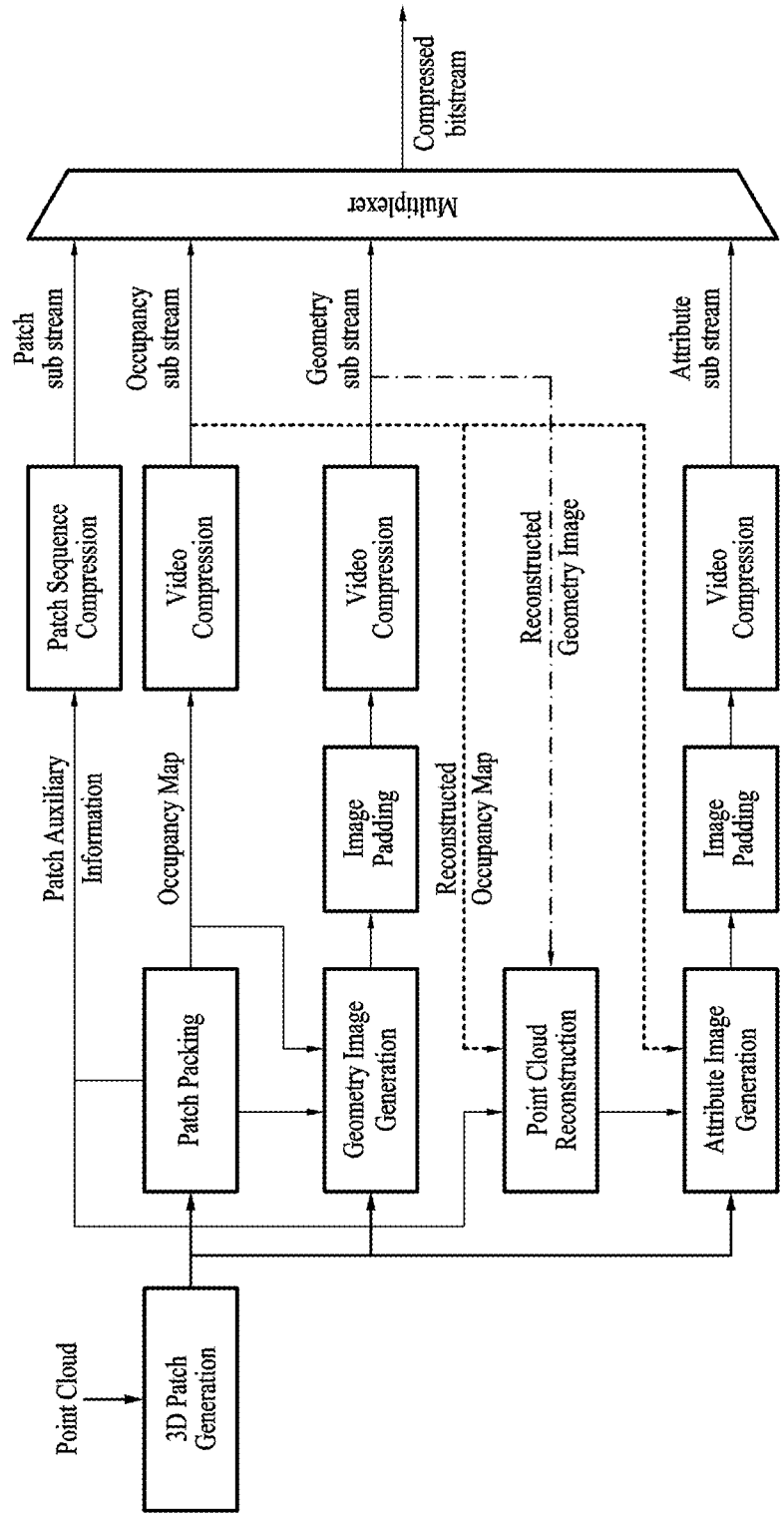
FIGS. 1 and 2 are views for explaining encoding and decoding of a point cloud based on V-PCC.

The embodiments will be described in detail herein with reference to the drawings.

However, it should be understood that the present disclosure is not limited to the embodiments according to the concept of the present disclosure, but includes changes, equivalents, or alternatives falling within the spirit and scope of the present disclosure.

In the following description of the present disclosure, a detailed description of known functions and configurations incorporated herein will be omitted when it may make the subject matter of the present disclosure unclear.

The terms used in the specification are defined in consideration of functions used in the present disclosure, and can be changed according to the intent or conventionally used methods of clients, operators, and users. Accordingly, definitions of the terms should be understood on the basis of the entire description of the present specification.

In description of the drawings, like reference numerals may be used for similar elements.

The singular expressions in the present specification may encompass plural expressions unless clearly specified otherwise in context.

In this specification, expressions such as "A or B" and "at least one of A and/or B" may include all possible combinations of the items listed together.

Expressions such as "first" and "second" may be used to qualify the elements irrespective of order or importance, and are used to distinguish one element from another and do not limit the elements.

It will be understood that when an element (e.g., first) is referred to as being "connected to" or "coupled to" another element (e.g., second), it may be directly connected or coupled to the other element or an intervening element (e.g., third) may be present.

As used herein, "configured to" may be used interchangeably with, for example, "suitable for", "ability to", "changed to", "made to", "capable of", or "designed to" in terms of hardware or software.

In some situations, the expression "device configured to" may mean that the device "may do~" with other devices or components.

For example, in the sentence "processor configured to perform A, B, and C", the processor may refer to a general-purpose processor (e.g., CPU or application processor) capable of performing corresponding operation by running a dedicated processor (e.g., embedded processor) for performing the corresponding operation, or one or more software programs stored in a memory device.

In addition, the expression "or" means "inclusive or" rather than "exclusive or."

That is, unless otherwise mentioned or clearly inferred from context, the expression "x uses a or b" means any one of natural inclusive permutations.

In the above-described specific embodiments, elements included in the disclosure are expressed singular or plural in accordance with the specific embodiments shown.

It should be understood, however, that the singular or plural representations are to be chosen as appropriate to the situation presented for the purpose of description and that the above-described embodiments are not limited to the singular or plural constituent elements. The constituent elements expressed in plural may be composed of a single number, and constituent elements expressed in singular form may be composed of a plurality of elements.

In addition, the present disclosure has been described with reference to exemplary embodiments, but it should be understood that various modifications may be made without departing from the scope of the present disclosure.

Therefore, the scope of the present disclosure should not be limited by the embodiments, but should be determined by the following claims and equivalents to the following claims.

Figure 2:
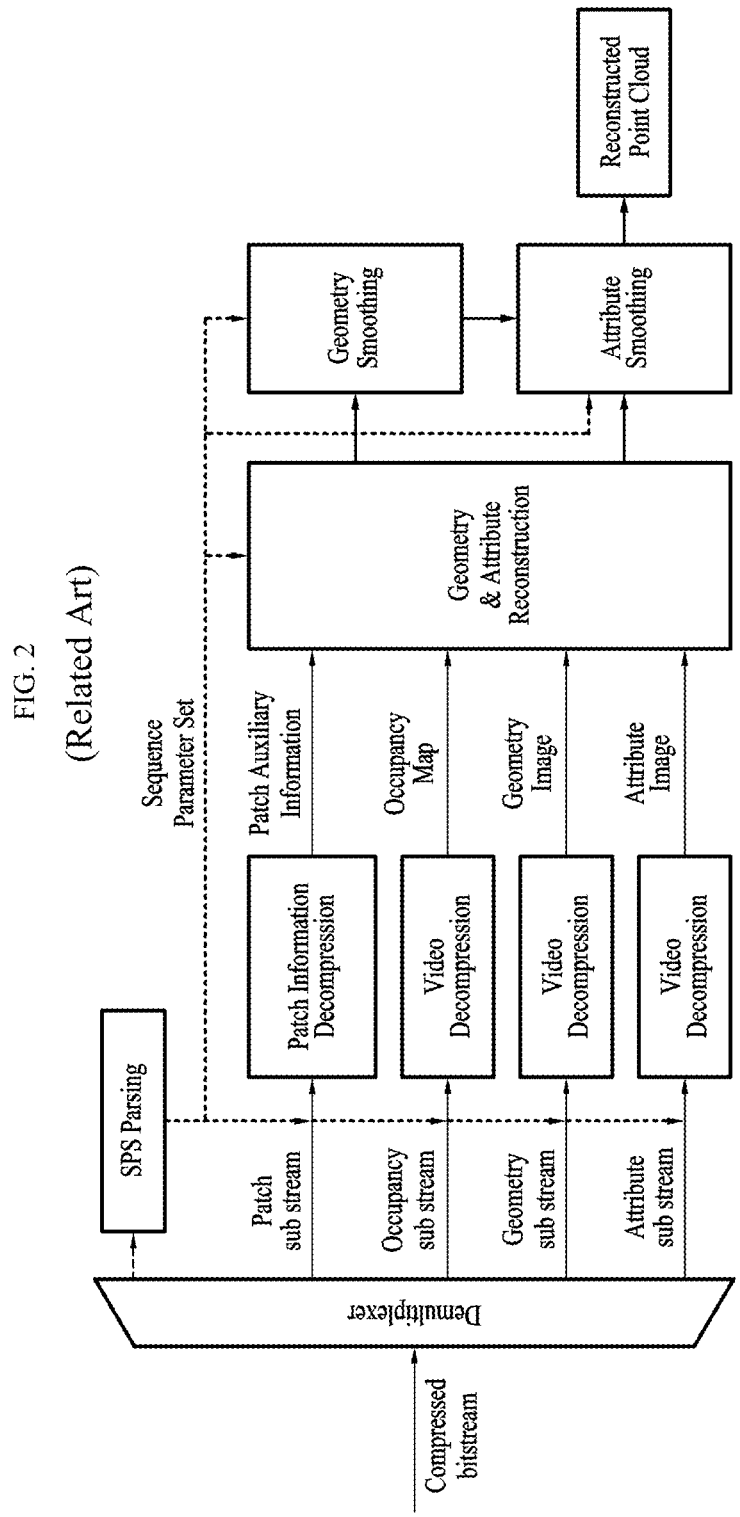

FIGS. 1 and 2 are views for explaining encoding and decoding of a point cloud based on V-PCC.

Referring to FIG. 1, a block diagram of a V-PCC encoder configured to generate a V3C bitstream by encoding a point cloud based on V-PCC is illustrated.

A point cloud is a data that expresses the surface information of a 3D object with numerous points. Here, each point may have various attribute values including 3D position information and color information of the corresponding position. The Video-based Point Cloud Compression (V-PCC) technology may use a video codec to compress a point cloud by dividing the point into a patch unit and performing a 2D spatial projection process. Patch auxiliary information that generates an occupancy map configured to indicate whether a 2D pixel is occupied through a 2D spatial projection process, a geometry image including 3D spatial information, and an attribute image configured to store an attribute value such as color information, compresses each of the images using a video codec, and informs the relationship between 2D and 3D spaces may perform lossless compression through entropy coding.

In FIG. 1, a point cloud is received as an input, normal vectors of all points are calculated, and points that are close to each other and have a similar normal vector direction may be separated in a patch unit. In a patch packing process, each patch is projected around a point cloud based on six projection planes perpendicular to one of X, Y, and Z axes, and placed in a 2D space not so as to overlap each other, each patch may be rotated in four directions or may have eight inverted directionality, arrangement information of a 2D space may be stored as an occupancy map, and a correlation between a 2D space and a 2D space may be stored as patch auxiliary information. Based on an occupancy map and patch auxiliary information in a process of geometry image generation and attribute image generation, a geometric image, which stores a distance between a projection plane and each point as a brightness value, and a property image, which stores a property value such as color information of each point, may be created. To increase the efficiency of video codec compression in an image padding process, a region without patch auxiliary information in a geometry image and an attribute image may be filled with reference to a value of a main region including patch auxiliary information. In patch auxiliary information, information required in a decoding process may be losslessly compressed using entropy coding, and the occupancy map, the geometry image, and the attribute image may be individually compressed using a video codec, and a V-PCC encoding process may be terminated through a process of merging into one bitstream.

FIGS. 1 and 2 illustrate a block diagram of a V-PCC encoder for decoding a point cloud encoded based on V-PCC. A process of parsing sequence information (sequence parameter set) from one bitstream, and then separating compression information of patch auxiliary information, occupancy map, a geometry image, and an attribute image may be first performed. The sequence information may include auxiliary information necessary for each step of a decoder. The patch auxiliary information may be decoded by applying entropy coding, and the occupancy map, the geometry image, and the attribute image may be decoded using a video codec. In a point cloud reconstruction process, 2D information and projection plane information in 3D space may be checked using patch auxiliary information and occupancy map, and then points are created using a brightness value of each position in a geometry image based on an occupancy map, and an attribute value such as color information of an attribute image may be added. In a smoothing process, a geometry smoothing process, which is a stage of correcting a discontinuous part occurring at a boundary of each patch, uses a 3D filter to change the position of a boundary point to be similar to those of neighboring points, and an attribute smoothing stage may change an attribute value such as color information of a boundary point with reference to values of neighboring points. By correcting the boundary point of the reconstructed point cloud, the process of generating the compressed point cloud through the V-PCC decoding process may be terminated.

Figure 3:
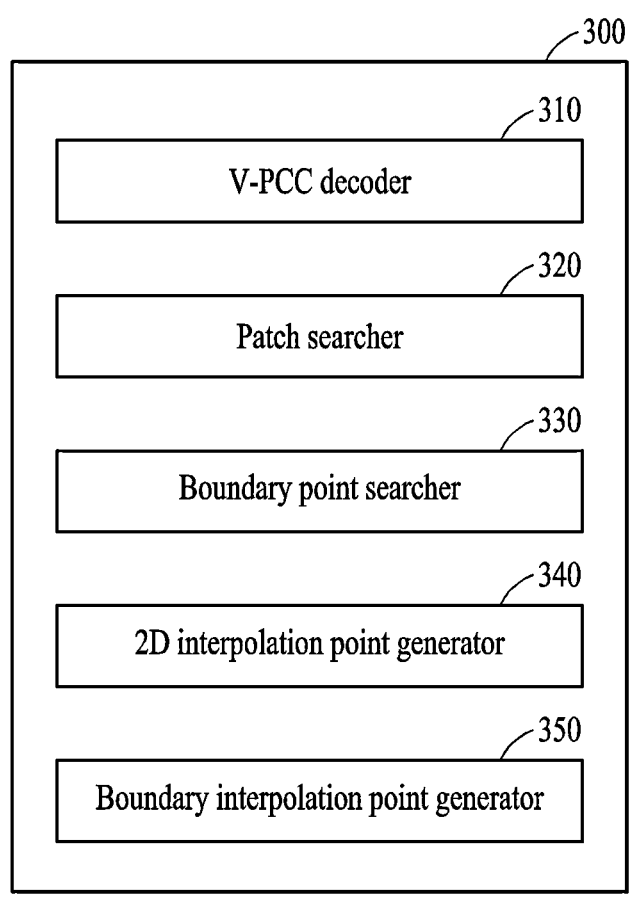
FIG. 3 illustrates a block diagram of a point cloud interpolation apparatus according to an embodiment of the present disclosure.

FIG. 3 illustrates a block diagram of a point cloud interpolation apparatus according to an embodiment of the present disclosure.

Referring to FIG. 3, a point cloud interpolation apparatus 300 according to an embodiment of the present disclosure may include a V-PCC decoder 310, a patch searcher 320, a 3D interpolation point generator and a boundary interpolation point generator 350.

The V-PCC decoder 310 may decode patch auxiliary information, geometric image, and attribute image by decoding a V3C bitstream encoded based on V-PCC, and may generate a point cloud based thereon. Here, the patch auxiliary information may include 2D and 3D spatial information of each patch. The occupancy map refers to a map in which point occupancy information in 2D space is expressed as 0 and 1. The geometry image may include information such as a distance from a projection plane. The attribute image may include texture information such as each point color.

Figure 4:
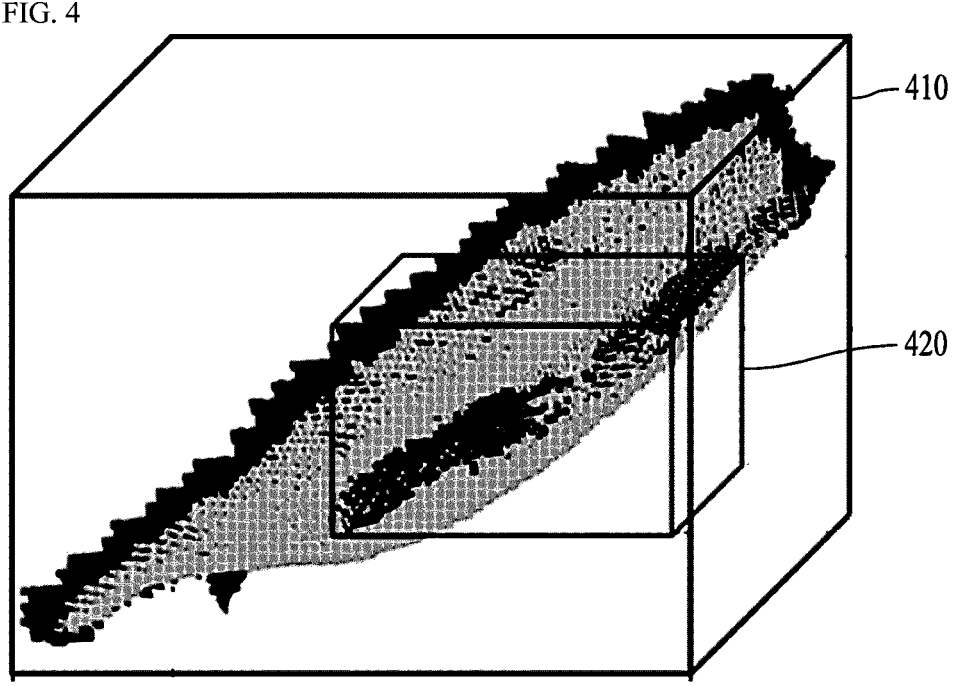
FIGS. 4, 5A and 5B illustrate examples of an external patch and internal patch according to an embodiment of the present disclosure.

The point cloud interpolation apparatus 300 may search for an internal patch, included in another patch, and an external patch, which includes an internal patch therein, among a plurality of patches formed by a point cloud based on patch auxiliary information. For example, as shown in FIG. 4, an internal patch 420 may exist in an external patch 410.

In an embodiment, the patch searcher 320 may compare 3D spatial position coordinates of a plurality of patches based on 3D spatial information of each patch included in patch auxiliary information and may check patches with overlapping 3D spatial position information as an internal patch and an external patch.

A boundary point searcher 330 may search for an additional boundary point of an external patch by projecting boundary points of an internal patch into a 2D patch space of the external patch. Here, when there is a space between the external patch and the internal patch, the additional boundary point is to reflect the space to the external patch.

Figure 5A:
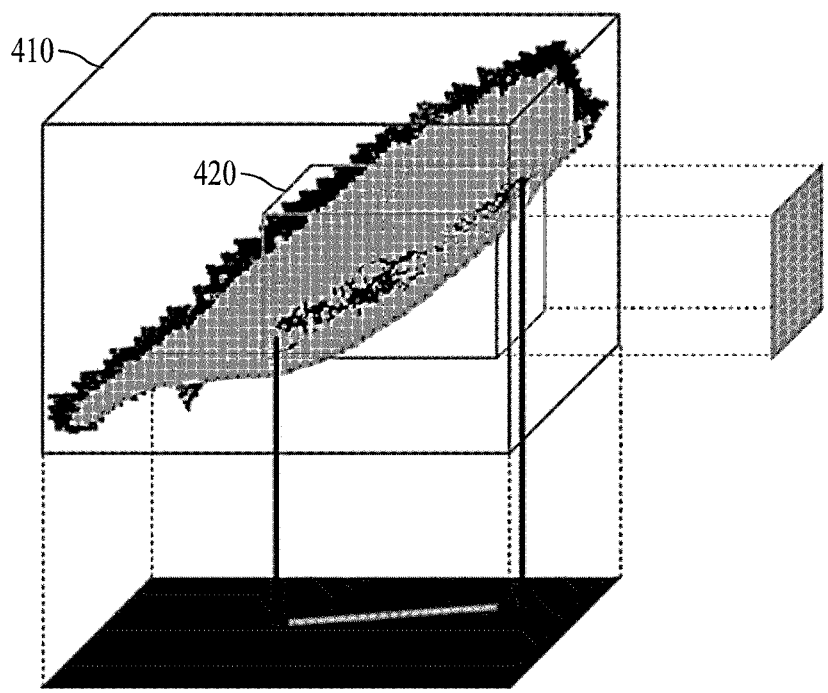
Figure 5B:
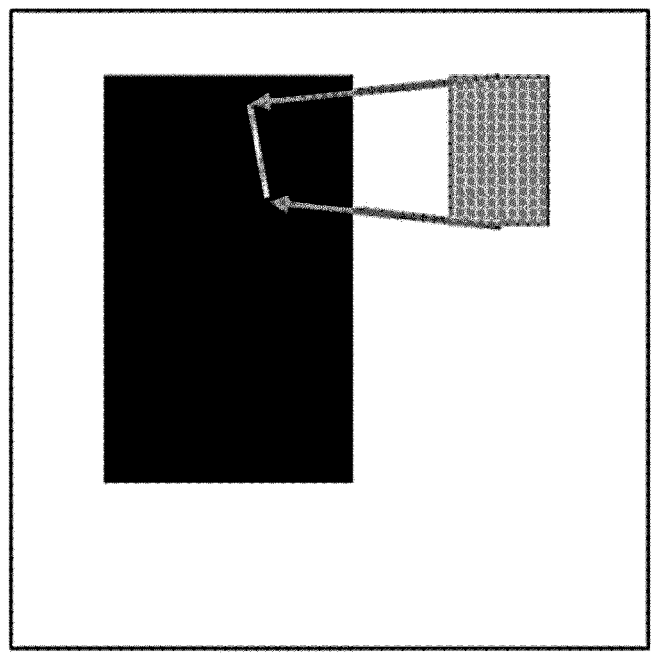

In an embodiment, the boundary point searcher 330 may extract the location information of the overlapping region on the 2D patch space by projecting the points of the internal patch into the 2D patch space of the external patch. FIG. 5A illustrates an example projected into a 2D space of each of an internal patch and an external patch, and FIG. 5B illustrates the overlapping location region of an internal patch projected into a 2D patch space of an external patch. The boundary point searcher 330 may determine a point corresponding to location information among points of an external patch as an additional boundary point of the external patch when the point corresponding to location information among points of the external patch and a point corresponding to location information among points of the internal patch are within a preset distance in 3D space. Here, the preset distance may be changed differently depending on the use purpose of point cloud interpolation.

In an embodiment, the patch searcher 320 may determine the location information of a region where an external patch and an internal patch overlap in a 2D space according to Equations 1 and 2 below.

$$2D\ \text{location}[x, y] \begin{cases} x = u_{Min_{or}Max} + u*\cos\theta° - v*\sin\theta° \\ y = v_{Min_{or}Max} + u*\sin\theta° + v*\cos\theta° \end{cases} \text{[Equation 1]}$$

$$2D\ \text{location}[x, y] \begin{cases} x = u_{Min_{or}Max} - u*\cos\theta° - v*\sin\theta° \\ y = v_{Min_{or}Max} - u*\sin\theta° + v*\cos\theta° \end{cases} \text{[Equation 2]}$$

Here, Equation 1 may be used when the 2D patch is rotated by 0°, 90°, 180°, 270° in a patch packing process, and Equation 2 may be used when the 2D patch is reversed (mirrored) in each direction. $u_{Min_{or}Max}$, $v_{Min_{or}Max}$ respectively mean a minimum value or maximum value in a horizontal position and vertical position of the external patch, may mean a minimum value when + operation is applied, and may mean a maximum value when − operation is applied. With regard to u, v, a coordinate value of the projection plane and tangential direction of the external patch among the three 3D position information coordinate values of the projected point is set as u, and another coordinate value perpendicular to the tangential direction and parallel to the projection plane may be set as v. Θ may be projected into a 2D space of an external patch of a point included in the internal patch by applying Equation 1 in a rotation direction applied in the patch packing process of the external patch.

Figure 6A:
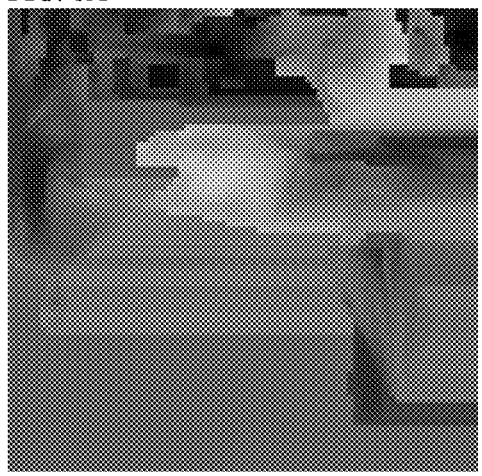
FIGS. 6A, 6B and 6C illustrate a geometry image, an attribute image and a boundary map according to an embodiment of the present disclosure.
Figure 6B:
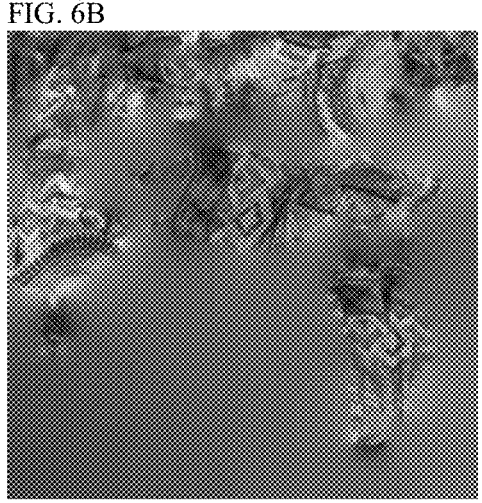
Figure 6C:

A 2D interpolation point generator 340 may generate a boundary map based on boundary points and additional boundary points of a plurality of patches. Referring to FIGS. 6A-6C, FIG. 6A illustrates a geometry image, FIG. 6B illustrates an attribute image, and FIG. 6C illustrates an example of a boundary map created based on boundary points and additional boundary points of a plurality of patches.

Figure 7A:
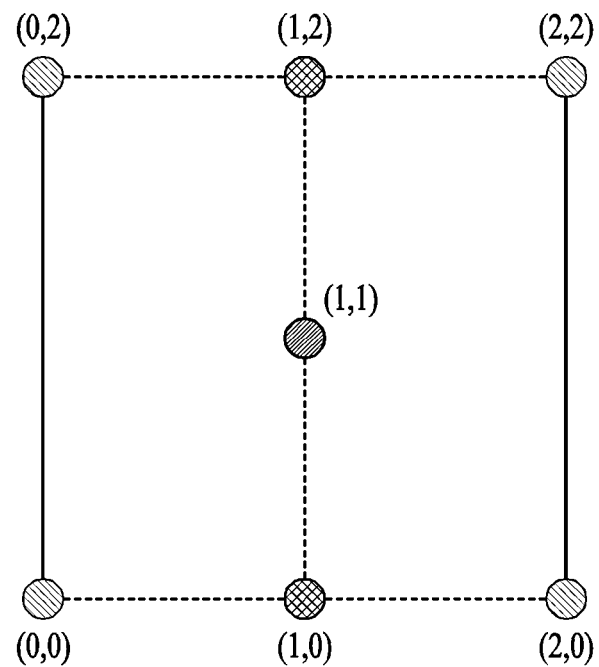
FIGS. 7A and 7B are views for explaining a 2D interpolation technology according to an embodiment of the present disclosure.
Figure 7B:
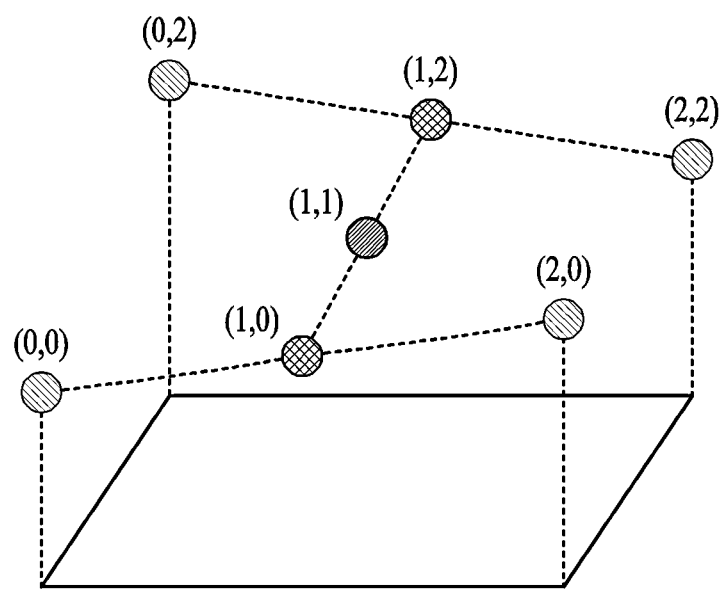

The 2D interpolation point generator 340 may generate a 2D interpolation point, which is a new point for an occupied area, by applying a 2D interpolation technology to a geometry image and attribute image based on a boundary map. Referring to FIGS. 7A and 7B, FIG. 7A illustrates an example of application of the 2D interpolation technology in a 2D space, and FIG. 7B illustrates an example of the 2D interpolation technology applied to and expressed in a 3D space. Specifically, the 2D interpolation technology applied to a geometry image and an attribute image is a technology for estimating a value located between points using values of previously known points and may be used to estimate a value of a newly created point when changing a resolution of a 2D image. In the process of FIGS. 7A and 7B, previously known points are (0,0), (0,2), (2,0), and (2,2) points, the points (1,2) and (1,0) are values estimated using values of the points (0,2), (2,2) and (0,0), (2,0), respectively, and the point (1,1) may be a value estimated using a value of the point (1,2), (1, 0). FIG. 9 illustrates an embodiment in which the interpolation technology is applied to a geometry image. A location occupied by the patch may be found by referring to a boundary map, and an interpolation geometry image with a high resolution may be created by applying an interpolation technology to the corresponding location. An attribute image may also create an interpolation attribute image in the same way and may create an image including geometry and attribute information between points not included in existing V-PCC information.

When creating a point cloud by V-PCC, a 3D position coordinate $[x_{Pn}, y_{Pn}, z_{Pn}]$ of an nth point may be determined according to Equation 3 below:

$$x_{PN}=s_0+u-u_0,$$

$$y_{PN}=\gamma_0+v-v_0,$$

$$z_{Pn}=d_0+Y_{Geo}[u,v] \qquad \text{[Equation 3]}$$

wherein $[s_0, \gamma_0, d_0]$ mean a minimum 3D coordinate value of a patch including an n-th point, $[u_0, v_0]$ mean a minimum 2D spatial coordinate value. [u,v] means a 2D position coordinate of an n-th point, and $Y_{Geo}[u, v]$ means brightness information of coordinate of a geometry image.

A 3D coordinate calculation for creating a new point using an interpolation geometry image and an interpolation attribute image may be determined according to Equation 4 below:

$$x_{Pn[l/a,l/a]}=s_0+u-u_0+(l/a)\times(d\times\cos\theta°+\sin\theta°)$$

$$y_{Pn[l/a,l/a]}=\gamma_0+v-v_0+(l/a)\times(d\times\cos\theta°+\sin\theta°)$$

$$z_{PN[l/a,l/a]}=d_0+Y_{lG}[u\times a-(l/a)\times(d\times\cos\theta°-\sin\theta°), v\times a-(l/a)\times(d\times\sin\theta°+\cos\theta°)] \qquad \text{[Equation 4]}$$

wherein l means an LoD value that is magnification unit of a patch projection process, a means a magnification expanded in an interpolation process, and d and Θ are values that change according to a 2D projection method of a patch including an n-th point. Here, is 1 if a patch containing an n-th point is not reversed and −1 if it is reversed, and Θ means a rotation angle of a patch in 2D projection. To create a point at distance $$[l/a, l/a]$$

from an n-th point in a 2D grid, a new point may be created between existing points by calculating the 3D position coordinate $[x_{Pn[l/a,l/a]}, y_{Pn[l/a,l/a]}, z_{Pn[l/a,l/a]}]$ through the process of Equation 3 considering patch rotation.

Figure 8A:
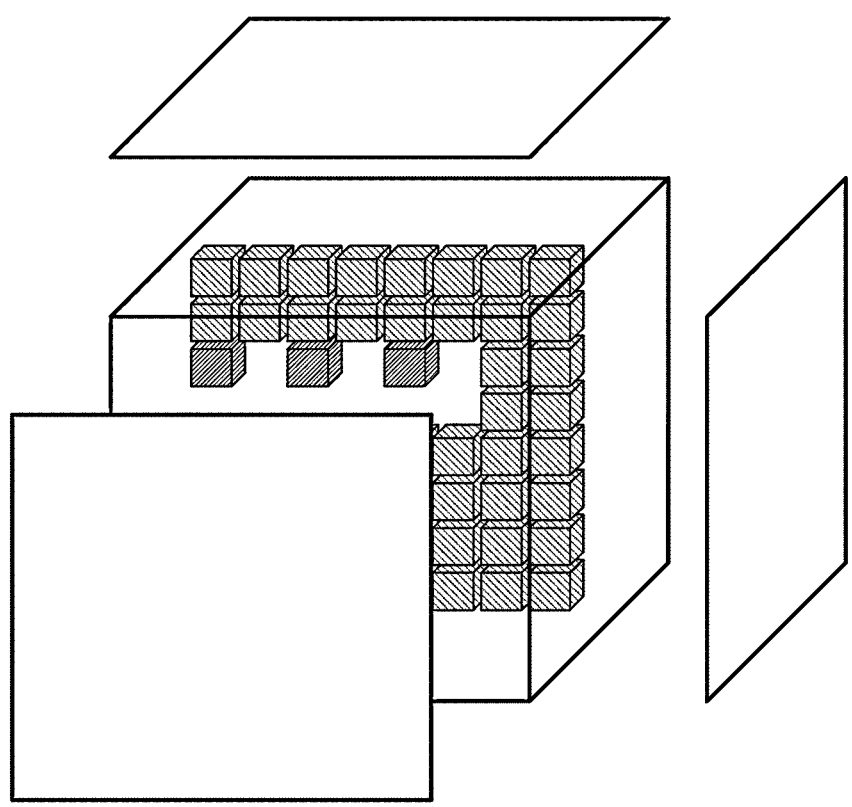

The boundary interpolation point generator 350 may divide the entire space formed by the point cloud and the 2D interpolation point into regions of a preset size. For example, as shown in FIG. 8A, the space formed by the point cloud may be divided into regions of a preset size.

Figure 8B:
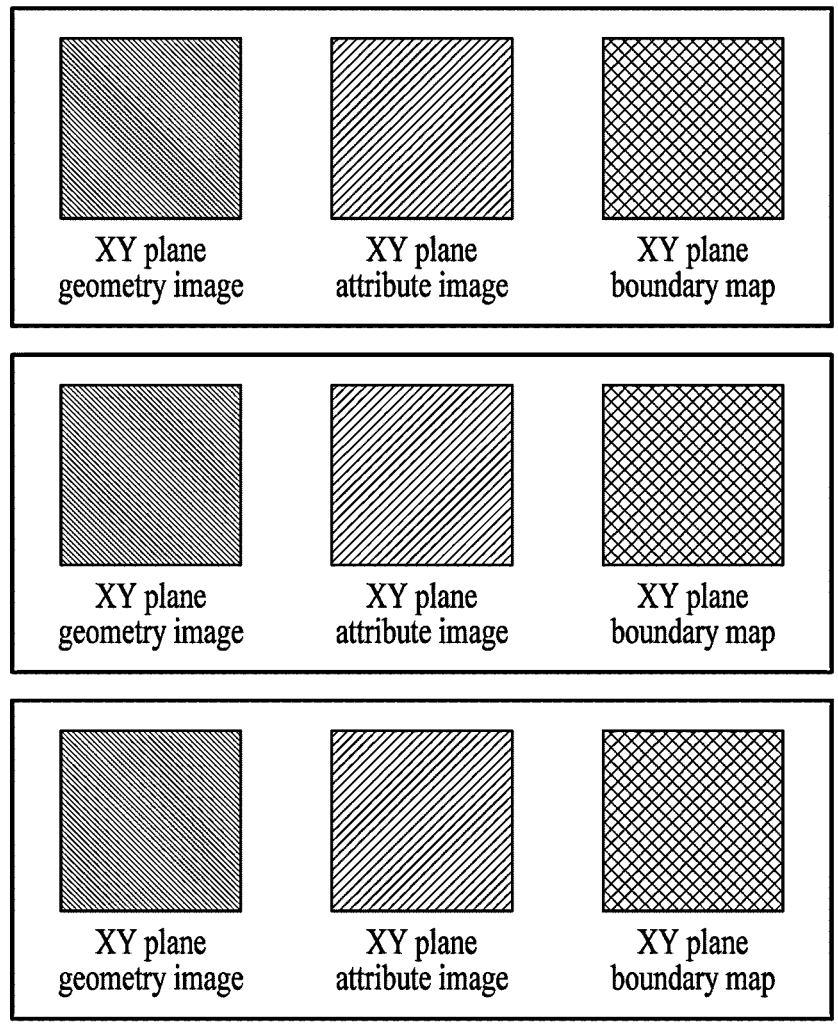

The boundary interpolation point generator 350 may create an interpolation geometry image, an interpolation attribute image, and an interpolation boundary map by projecting each divided region based on XY, XZ and YZ planes only for a region including boundary points. For example, as shown in FIG. 8B, a geometry image (stores a distance between each plane and each point), an attribute image (stores attribute information), and a boundary map (stores whether it is occupied and whether it is a boundary point) may be created for each of the XY, XZ and YZ planes on which each divided region is projected.

The boundary interpolation point generator 350 may generate interpolation pixel information by applying a 2D interpolation technology using neighboring pixel information in an unoccupied region among neighboring regions of boundary points based on the interpolation boundary map. The boundary interpolation point generator 350 may create a boundary interpolation point, which is a new point for the unoccupied region, based on 3D spatial information about the interpolation pixel and region. Here, the same technology as the 2D interpolation shown in FIGS. 7A and 7B may be applied to the 2D interpolation. Referring to FIG. 9, a boundary point may be found using the boundary diagram created in the 3D point projection, and at a position not occupied around the boundary point, an interpolation pixel of empty space may be calculated from neighboring pixel information of the geometric image and the attribute image through the same 2D operation as in an interpolation filter of an interpolation point creation step 130. The following Equation 5 shows an example of calculating 3D position coordinates $[x_p, y_p, z_p]$:

$$x_P = x_0 + i \qquad \begin{cases} \text{if } XY_{plane}, k = XY_{plane}[i, j] \\ \text{if } XZ_{plane}, j = XZ_{plane}[i, k] \\ \text{if } YZ_{plane}, i = YZ_{plane}[j, k] \end{cases} \quad \text{[Equation 5]}$$
$$y_P = y_0 + j \quad [i, j, k]$$
$$z_P = z_0 + k$$

wherein $[x_0, y_0, z_0]$ means 3D reference position coordinates of the divided area (block) of FIG. 9. [i, j, k] means 3D position coordinates inside the block. When a projection plane used for point creation uses XY plane, $$x_P = x_0 + i \qquad \begin{cases} \text{if } XY_{plane}, k = XY_{plane}[i, j] \\ \text{if } XZ_{plane}, j = XZ_{plane}[i, k] \\ \text{if } XY_{plane}, i = YZ_{plane}[j, k] \end{cases} \quad \text{[Equation 5]}$$
$$y_P = y_0 + j \quad [i, j, k]$$
$$z_P = z_0 + k$$

may determine a point creation position using the [i, j] coordinate value of XY plane geometry image. When the projection plane used for point creation uses XZ plane, j may determine a point creation position using the [i, k] coordinate value of XZ plane geometry image. When the projection plane used for point creation uses YZ plane, i may determine a point creation position using the [j, k] coordinate value of XZ plane geometry image. When the points generated by this process are output, an interpolated point cloud may be finally obtained.

Figure 10:
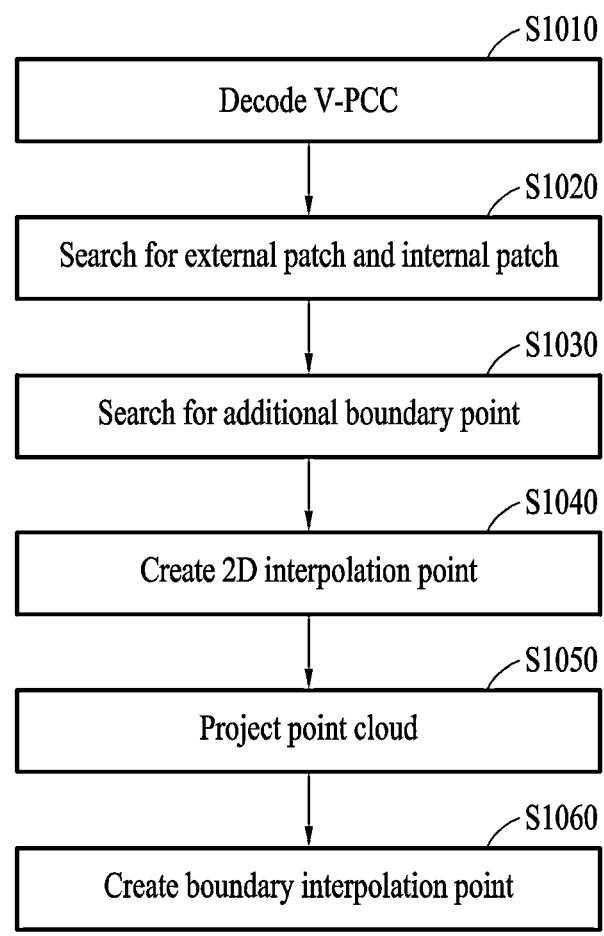
FIG. 10 illustrates a flowchart of a point cloud interpolation method according to an embodiment of the present disclosure.

FIG. 10 illustrates a flowchart of a point cloud interpolation method according to an embodiment of the present disclosure.

Hereinafter, the method of FIG. 10 by the point cloud interpolation apparatus 300 shown in FIG. 3 is described as an embodiment.

In S1010, V-PCC decoding is performed. The point cloud interpolation apparatus 300 may decode patch auxiliary information, geometric image, and attribute image by decoding a V3C bitstream encoded based on V-PCC, and may generate a point cloud based thereon. Here, the patch auxiliary information may include 2D and 3D spatial information of each patch. The occupancy map refers to a map in which point occupancy information in 2D space is expressed as 0 and 1. The geometry image may include information such as a distance from a projection plane. The attribute image may include texture information such as each point color.

In S1020, an external patch and an internal patch are searched. The point cloud interpolation apparatus 300 may search for an internal patch, included in another patch, and an external patch, which includes an internal patch therein, among a plurality of patches formed by a point cloud based on patch auxiliary information.

In an embodiment, the point cloud interpolation apparatus 300 may compare 3D spatial position coordinates of a plurality of patches based on 3D spatial information of each patch included in the patch auxiliary information and may check patches with overlapping 3D spatial position information as an internal patch and an external patch.

In S1030, an additional boundary point is searched. The point cloud interpolation apparatus 300 may search for an additional boundary point of an external patch by projecting boundary points of an internal patch into a 2D patch space of the external patch. Here, when there is a space between the external patch and the internal patch, the additional boundary point is to reflect the space to the external patch.

In an embodiment, the point cloud interpolation apparatus 300 may extract location information of an overlapping region on a 2D patch space of the external patch by projecting points of the internal patch into the 2D patch space. The point cloud interpolation apparatus 300 may determine a point corresponding to the location information among points of the external patch as an additional boundary point of the external patch when a point corresponding to the location information among points of the external patch and a point corresponding to the location information among points of the internal patch are within a preset distance in 3D space. Here, the preset distance may be changed differently depending on the use purpose of point cloud interpolation.

In S1040, a 2D interpolation point is created. the point cloud interpolation apparatus 300 may generate a boundary map based on boundary points and additional boundary points of a plurality of patches. The point cloud interpolation apparatus 300 may generate a 2D interpolation point, which is a new point for an occupied area, by applying a 2D interpolation technology to a geometry image and attribute image based on a boundary map.

In S1050, a point cloud is projected. The point cloud interpolation apparatus 300 may divide the entire space formed in a point cloud and a 2D interpolation point into regions of a preset size. The point cloud interpolation apparatus 300 may create an interpolation geometry image, an interpolation attribute image, and an interpolation boundary map by projecting each divided region based on XY, XZ, and YZ planes only for a region including boundary points.

In S1060, boundary interpolation points are created. The point cloud interpolation apparatus 300 may generate interpolation pixel information by applying a 2D interpolation technology using neighboring pixel information in an unoccupied region among neighboring regions of boundary points based on an interpolation boundary map. The point cloud interpolation apparatus 300 may create a boundary interpolation point, which is a new point for an unoccupied region, based on 3D spatial information about the interpolation pixel and region. Here, the same technology as the 2D interpolation shown in FIG. 7 may be applied to the 2D interpolation.

Figure 11:
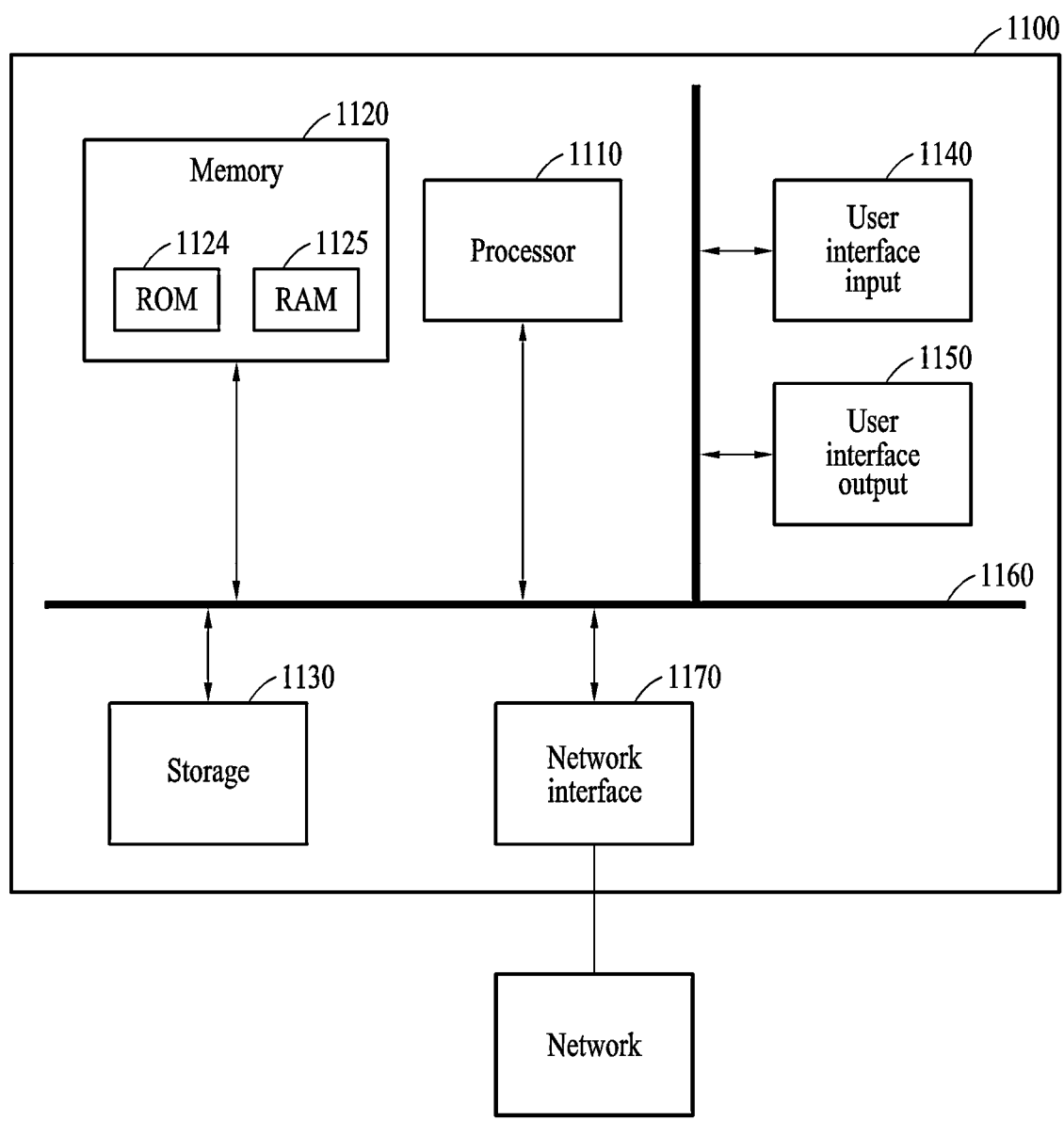
FIG. 11 illustrates a block diagram of a point cloud interpolation apparatus according to another embodiment of the present disclosure.

FIG. 11 illustrates a block diagram of an apparatus for generating a depth image according to another embodiment of the present disclosure.

As shown in FIG. 11, a point cloud interpolation apparatus 1100 may include at least one element of a processor 1110, a memory 1120, a storage 1130, a user interface input 1140, and a user interface output 1150. These elements may communicate with each other via a bus 160. In addition, the point cloud interpolation apparatus 1100 may also include a network interface 1170 for accessing a network. The processor 1110 may be a CPU or semiconductor device that executes processing instructions stored in the memory 1120 and/or the storage 1130. The memory 1120 and the storage 1130 may include various types of volatile/nonvolatile storage media. For example, the memory may include ROM 1124 and RAM 1125.

In accordance with an aspect of the present disclosure, efficient point cloud interpolation is possible.

In addition, in accordance with another aspect of the present disclosure, a 2D interpolation technology can be applied based on 3D spatial information.

Further, in accordance with still another aspect of the present disclosure, a point cloud can be interpolated using V-PCC decoding information.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The methods according to the embodiments of the present disclosure may be implemented in the form of a program command that can be executed through various computer means and recorded in a computer-readable medium. The computer-readable medium can store program commands, data files, data structures or combinations thereof. The program commands recorded in the medium may be specially designed and configured for the present disclosure or be known to those skilled in the field of computer software. Examples of a computer-readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include machine language code created by a compiler and high-level language code executable by a computer using an interpreter and the like. The hardware devices described above may be configured to operate as one or more software modules to perform the operations of the embodiments, and vice versa.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

Although the present disclosure has been described with reference to limited embodiments and drawings, it should be understood by those skilled in the art that various changes and modifications may be made therein. For example, the described technologies may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

DESCRIPTION OF SYMBOLS

300: point cloud interpolation apparatus
310: V-PCC decoder
320: patch searcher
330: boundary point searcher
340: 2D interpolation point generator
350: boundary interpolation point generator

What is claimed is:

1. An apparatus for interpolating a point cloud, comprising:
   a memory configured to store computer-readable instructions; and
   one or more processors configured to execute the computer-readable instructions to:
   generate a point cloud by decoding patch auxiliary information, an occupancy map, a geometry image, and an attribute image from a V3C bitstream,
   search for an internal patch, which is comprised inside another patch, and an external patch, which comprises the internal patch thereinside, among a plurality of patches based on the patch auxiliary information,
   search for an additional boundary point of the external patch by projecting a boundary point of the internal patch into a 2D patch space of the external patch,
   create a boundary map based on boundary points of the plural patches and the additional boundary point and generate a 2D interpolation point that is a new point for an occupied area by applying a 2D interpolation technology to the geometry image and the attribute image based on the boundary map, and
   divide an entire space formed by the point cloud and the 2D interpolation point into regions of a preset size, create an interpolation geometry image, an interpolation attribute image, and an interpolation boundary map by projecting each divided region based on XY, XZ and YZ planes, to create interpolation pixel information by applying a 2D interpolation technology using neighboring pixel information in an unoccupied region among neighboring regions of boundary points based on the interpolation boundary map, and create a boundary interpolation point, which is a new point for the unoccupied region, based on 3D spatial information about the interpolation pixel and region.

2. The apparatus according to claim 1, wherein the one or more processors are further configured to execute the computer-readable instructions to compare 3D spatial position coordinates of a plurality of patches based on 3D spatial information of each patch comprised in the patch auxiliary information to search for the internal patch and the external patch.

3. The apparatus according to claim 1, wherein the one or more processors are further configured to execute the computer-readable instructions to extract location information of an overlapping region on a 2D patch space of the external patch by projecting points of the internal patch into the 2D patch space, and determine a point corresponding to the location information among points of the external patch as an additional boundary point of the external patch when a point corresponding to the location information among points of the external patch and a point corresponding to the location information among points of the internal patch are within a preset distance in 3D space.

4. The apparatus according to claim 3, wherein the location information of the overlapping region is determined according to an equation as follows:

$$2D\ \text{location}[x, y] \begin{cases} x = u_{Min_{or}Max} + u*\cos\theta° - v*\sin\theta° \\ y = v_{Min_{or}Max} + u*\sin\theta° + v*\cos\theta° \end{cases}.$$

5. The apparatus according to claim 3, wherein the location information of the overlapping region when the 2D patch space is reversed is determined according to an equation as follows:

$$2D\ \text{location}[x, y] \begin{cases} x = u_{Min_{or}Max} - u*\cos\theta° - v*\sin\theta° \\ y = v_{Min_{or}Max} - u*\sin\theta° + v*\cos\theta° \end{cases}.$$

6. The apparatus according to claim 1, wherein the 3D spatial information is determined according to an equation as follows:

$$x_p = x_0 + i$$

$$y_p = y_0 + j$$

$$z_p = z_0 + k.$$

7. A method of interpolating a point cloud by an apparatus for interpolating the point cloud, the apparatus comprising a memory configured to store computer-readable instructions and one or more processors configured to execute the computer-readable instructions to perform the method comprising:

generating a point cloud by decoding patch auxiliary information, an occupancy map, a geometry image, and an attribute image from a V3C bitstream;

searching for an internal patch, which is comprised inside another patch, and an external patch, which comprises the internal patch thereinside, among a plurality of patches based on the patch auxiliary information;

searching for an additional boundary point of the external patch by projecting a boundary point of the internal patch into a 2D patch space of the external patch;

creating a boundary map based on boundary points of the plural patches and the additional boundary point and creating a 2D interpolation point that is a new point for an occupied area by applying a 2D interpolation technology to the geometry image and the attribute image based on the boundary map;

dividing an entire space formed by the point cloud and the 2D interpolation point into regions of a preset size and creating an interpolation geometry image, an interpolation attribute image, and an interpolation boundary map by projecting each divided region based on XY, XZ and YZ plane; and creating interpolation pixel information by applying a 2D interpolation technology using neighboring pixel information in an unoccupied region among neighboring regions of boundary points based on the interpolation boundary map and creating a boundary interpolation point, which is a new point for the unoccupied region, based on 3D spatial information about the interpolation pixel and region.

8. The method according to claim 7, wherein in the searching for an internal patch, which is comprised inside another patch, and an external patch, which comprises the internal patch thereinside, among a plurality of patches based on the patch auxiliary information, 3D spatial position coordinates of a plurality of patches are compared based on 3D spatial information of each patch comprised in the patch auxiliary information to search for the internal patch and the external patch.

9. The method according to claim 7, wherein the searching for an additional boundary point of the external patch by projecting a boundary point of the internal patch into a 2D patch space of the external patch comprises:

extracting location information of an overlapping region on a 2D patch space of the external patch by projecting points of the internal patch into the 2D patch space; and determining a point corresponding to the location information among points of the external patch as an additional boundary point of the external patch when a point corresponding to the location information among points of the external patch and a point corresponding to the location information among points of the internal patch are within a preset distance in 3D space.

10. The method according to claim 9, wherein the location information of the overlapping region is determined according to an equation as follows:

$$2D \text{ location}[x, y] \begin{cases} x = u_{Min_{or}Max} + u * \cos\theta° - v * \sin\theta° \\ y = v_{Min_{or}Max} + u * \sin\theta° + v * \cos\theta° \end{cases}.$$

11. The method according to claim 9, wherein the location information of the overlapping region when the 2D patch space is reversed is determined according to an equation as follows:

$$2D \text{ location}[x, y] \begin{cases} x = u_{Min_{or}Max} - u * \cos\theta° - v * \sin\theta° \\ y = v_{Min_{or}Max} - u * \sin\theta° + v * \cos\theta° \end{cases}.$$

12. The method according to claim 7, wherein the 3D spatial information is determined according to an equation as follows:

$$x_p = x_0 + i$$

$$y_p = y_0 + j$$

$$z_p = z_0 + k.$$

* * * * *